US007428549B2

(12) United States Patent
Chan et al.

(10) Patent No.: US 7,428,549 B2
(45) Date of Patent: Sep. 23, 2008

(54) METHOD AND APPARATUS FOR EDITING A PRODUCTION DATA STORE BY SHADOWING CONTENT

(75) Inventors: Yumman Chan, Rexdale (CA); David B Flaxer, Accord, NY (US); Miu-To Brenda Lam, North York (CA); Wan Ngai W. Lee, North York (CA)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 10/033,746

(22) Filed: Dec. 19, 2001

(65) Prior Publication Data

US 2003/0115220 A1 Jun. 19, 2003

(30) Foreign Application Priority Data

Dec. 18, 2001 (CA) .................................... 2365372

(51) Int. Cl.
*G06F 17/00* (2006.01)
(52) U.S. Cl. .................. 707/102; 707/101; 707/103 R; 707/104.1; 715/517; 715/526; 715/530
(58) Field of Classification Search ............... 707/1–10, 707/100–104.1, 200–206; 709/217–219; 715/517–530
See application file for complete search history.

(56) References Cited

U.S. PATENT DOCUMENTS

| | | | |
|---|---|---|---|
| 5,721,916 A | 2/1998 | Pardikar | |
| 6,175,343 B1 | 1/2001 | Mitchell et al. | 345/8 |
| 6,230,205 B1 | 5/2001 | Garrity et al. | 709/231 |
| 6,266,664 B1 | 7/2001 | Russell-Falla et al. | 707/5 |
| 6,269,359 B1 | 7/2001 | Sekine | 707/2 |
| 6,505,212 B2* | 1/2003 | Nakano et al. | 707/200 |
| 6,844,870 B2* | 1/2005 | Mukai et al. | 345/158 |
| 2001/0006391 A1* | 7/2001 | Sawano et al. | 345/418 |
| 2002/0188636 A1* | 12/2002 | Peck et al. | 707/530 |
| 2002/0194195 A1* | 12/2002 | Fenton et al. | 707/104.1 |
| 2004/0049598 A1* | 3/2004 | Tucker et al. | 709/217 |

FOREIGN PATENT DOCUMENTS

| | | |
|---|---|---|
| WO | WO 00/62265 | 10/2000 |
| WO | WO 00/65422 A2 | 11/2000 |
| WO | WO 00/65422 A3 | 11/2000 |
| WO | WO 00/70511 | 11/2000 |

OTHER PUBLICATIONS

"Auto-generation of customizable documentation for application files based on file content", Research Disclosure n444, Apr. 2001, Article 196, p. 694-5.

(Continued)

*Primary Examiner*—Isaac Woo
(74) *Attorney, Agent, or Firm*—MH2 Technology Law Group

(57) ABSTRACT

Improvements in the creation, maintenance and management of web based information are provided. A development environment conducive to separation of tasks and data, works in combination with the means to present views of changed information for approval to users. Data from file systems and database systems can be combined to create a rich source of material for users, while changes to such material can be effectively controlled and released for production.

17 Claims, 8 Drawing Sheets

OTHER PUBLICATIONS

"Project magic", Research Disclosure n438, Oct. 2000, Article 142, p. 1850-1.

Pazel, D.P., "Program Debugging in an Incompletely Assembled Runtime Environment", IBM Technical Disclosure Bulletin, vol. 40, No. 5, May 1997, p. 111-113.

Hacid, MS; Rigotti, C., "Representing and Reasoning on Conceptual Queries Over Image Databases", Foundations of Intelligent Systems. 11th International Symposium ISMIS '99, Proceedings, pp. 340-348, Berlin, Germany, 1999.

* cited by examiner

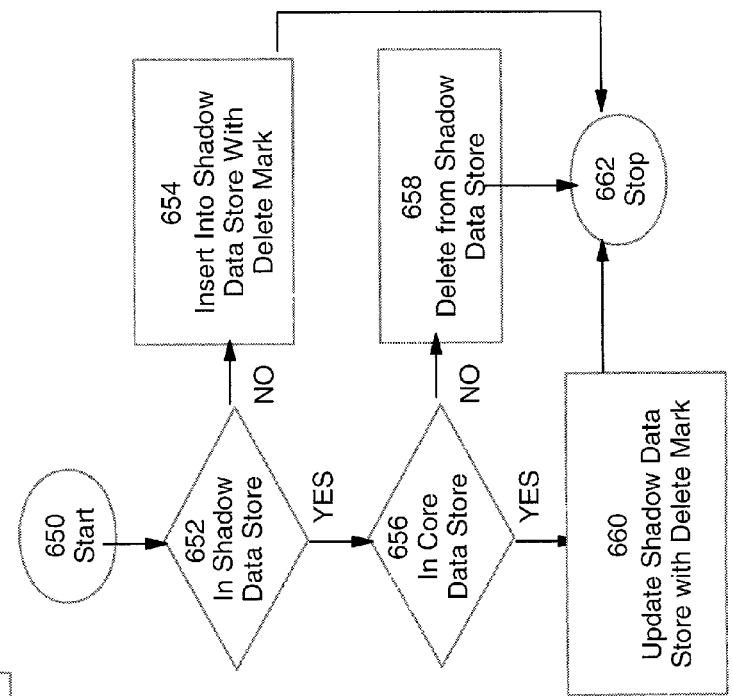
Fig. 6c
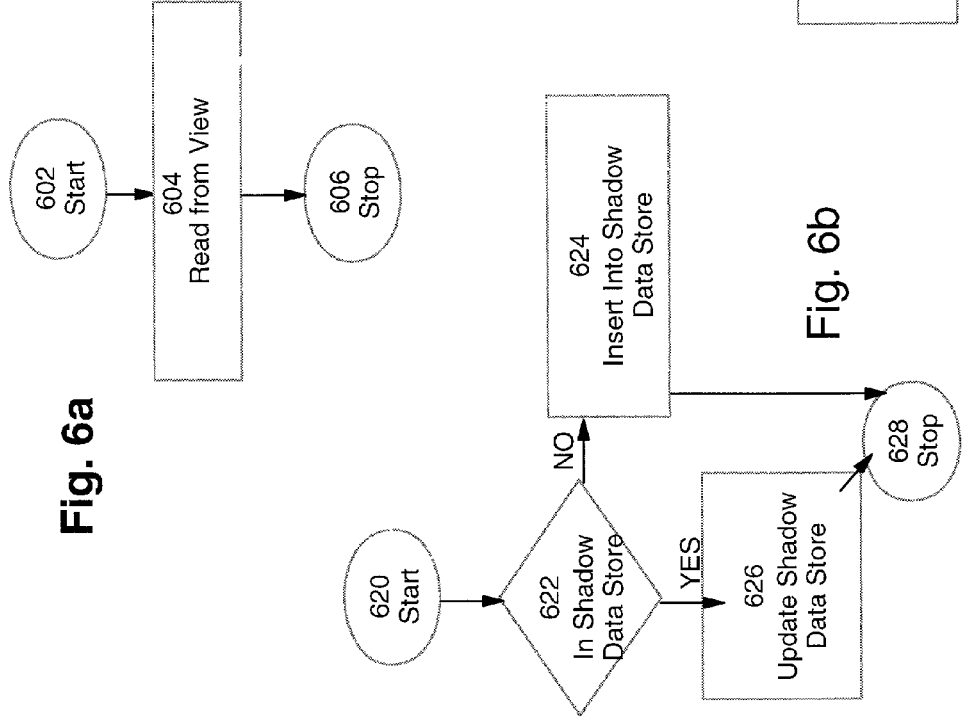
Fig. 6a
Fig. 6b

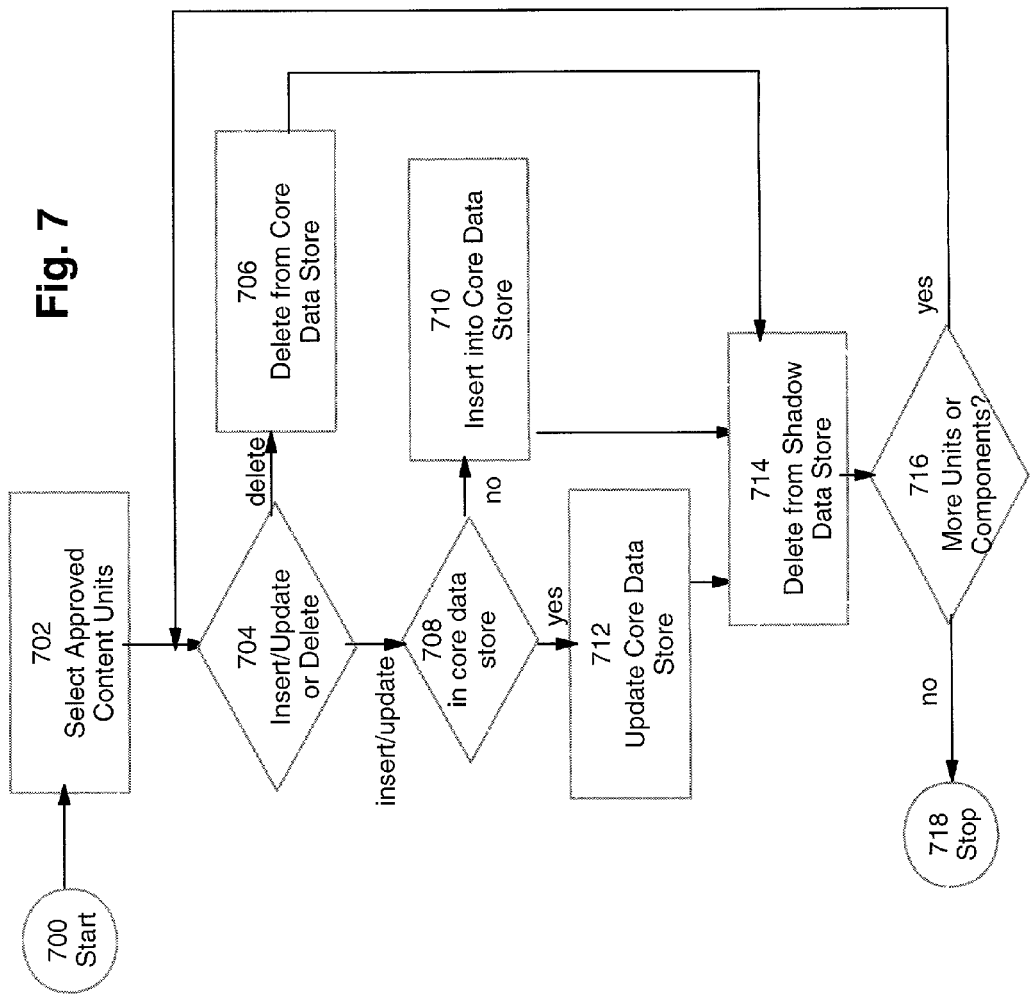

METHOD AND APPARATUS FOR EDITING A PRODUCTION DATA STORE BY SHADOWING CONTENT

BACKGROUND OF THE INVENTION

1. Field of the Invention

This invention relates generally to content management, and more particularly, to managing content by shadowing live contents with multiple views of content.

2. General Background

There are many internet and intranet sites in existence today serving pages of information to a multitude of users throughout the world. These sites rely on a variety of data sources, some providing fixed or static content, others providing dynamic content and typically hybrid sites serving a combination of static and dynamic content. As users seek more information in more efficient and easy to access forms the need for delivering that information places a series of complex demands on the underlying site.

Users expect information to be provided to them in a tailored manner by the sites they visit. These expectations requires the site providers to provide means to customize information to meet the users needs. This customization introduces complexity into the site creation, maintenance and management. In addition to the complexity of handling large amounts of data the site must also be maintained in a current state, yielding timely information to users requests.

In current sites, the application of changes to the production system may cause destructive changes to the site contents. This type of change replaces previous material with the new material and provides no mechanism for fallback. Errors created as a result of this process are immediately viewed by users of the site.

Site development may be able to segment the files used to create the look and feel of the site and assign responsibilities of updating such files to specific individuals. When the files have been updated a collection must be made to aggregate the changed files and perform some form of integration build to combine the files into a complete site. The integration result is not a granular entity in that approvers must look at the full site view to see changes. Many times this is more than an approver wants to deal with and may have difficulty is seeing the change.

Complexity of a site may make it difficult or impossible to overlay multiple layers of change onto the production system to enable a review. This scenario would force approval of a series of changes to be late in the process cycle adding risk to the change implementation. This complexity may also mean difficulty in establishment a duplicate of the production environment due to resource constraints and file management issues. The duplicate of the production site would be used for testing prior to releasing the new content or changed content into production.

Some content managers used by sites provide organization change recommendations based on frequency of use, providing information used to relocate files for faster access. These types of content managers can be considered as post production tools and do not provide assistance in the creation and review of site material. Such content managers are useful for tuning sites after they have been in production for a period of time.

Other types of content management may be used for analyzing and categorizing content after creation. Again these managers provide a useful service but offer nothing related to the creation and approval of content prior to production mode.

Some site content managers define a whole environment and require the use of special tags and conditional processing unique to that environment. The environment may also require a special interpreter, parser, cache mechanism, or user interface component, essentially specialized tools adapted for the environment. Additional requirements may constrain the implementation to the use of a proprietary relational database for parts management and containment.

An improvement in the content management means implemented in a web site is required to provide an enhanced means of introducing and managing changed content into productive use. An improved content management means is required to support both files and databases as information sources and should hide such underlying implementations from the site itself. A mechanism is required to overcome destruction of production content that may occur when new material is being provided for approval prior to production usage. Approvers need an efficient means to review changes they have requested and to not be hindered by other change activity on the site.

SUMMARY OF THE INVENTION

In accordance with the present invention some of the above mentioned disadvantages may be overcome by proposing a separation of development environment from the production environment and providing control of when and what to place into production.

According to an aspect of the invention, a method is provided for editing content of a production data store for use by a computer system, including replicating the production data store to produce a core data store and producing a shadow data store of a portion of the core data store.

In accordance with another aspect of the invention, a method is provided for modifying the shadow data store to produce a modified shadow data store and applying the modified shadow data store to the core data store to create a modified core data store, then propagating the modified core data store to the production data store to produce a modified production data store.

In accordance with another aspect of the invention, a method is provided for generating a user view for presentation to a user, from the shadow data store and the core data store, by combining content of the shadow data store with content of the core data store to produce a temporary image as a user view and presenting that temporary image to a user.

In accordance with another aspect of the invention a method is provided for editing content of a production data store for use by a computer system, including replicating the production data store to produce a core data store and producing a shadow data store of a portion of the core data store. The method provides additional support for generating user views for presentation to users, from the shadow data stores and the core data store, by combining content of the shadow data stores with content of the core data store to produce temporary images as user views and presenting the temporary images to users.

Another aspect of the invention, provides a method for editing content of a production data store for use by a computer system, including replicating the production data store to produce a core data store, producing shadow data stores of portions of the core data store. The method is then used for generating user views, for presentation to users, from respective shadow data stores and the core data store by combining content of the shadow data stores with content of the core data store to produce temporary images as user views and presenting those temporary images to respective users.

In accordance with another aspect of the invention, a method is provided for granting review access to the user views to reviewers for reviewing the temporary images, for acceptance. Acceptance of the temporary images then authorizes application of the shadow data stores associated with the accepted temporary images to the core data store. The authorized shadow data stores are then applied to the core data store to create a modified core data store, after which the modified core data store is then propagated to the production data store to produce a modified production data store.

In accordance with another aspect of the invention, each temporary image is an unique address in the computer system. Granting review access to the user views is achieved by disclosing the unique address of each temporary image to a reviewer and providing permission, if required, to view contents associated with the unique address of each temporary image.

In accordance with another aspect of the invention, the computer system has access to a network which uses a unique Uniform Resource Locator (URL) to address each temporary image on a network such as an Intranet or the Internet. The images are webpages selected from the set comprising documents, software programs, software modules, graphic images, video compositions, audio compositions and webpages.

In accordance with another aspect of the invention, a data processing system is provided for editing content of a production data store for use by a computer system, including a replicator for replicating the production data store to produce a core data store and a shadow producing system for creating a shadow data store of a portion of the core data store. The data processing system also includes a modifier for modifying the shadow data store to produce a modified shadow data store and a system means for applying the modified shadow data store to the core data store to create a modified core data store. The data processing system contains a propagator for propagating the modified core data store to the production data store to produce a modified production data store. The data processing system also includes a system for generating a user view for presentation to a user, from the shadow data store and the core data store, by combining content of the shadow data store with content of the core data store to produce a temporary image. The data processing system additionally contains a system for presenting the temporary image to a user.

In accordance with another aspect of the invention, a method is provided for the selection of temporary images from a set comprising documents, software programs, software modules, graphic images, video compositions, audio compositions and webpages.

In accordance with another aspect of the invention a data processing system is provided in which each temporary image has an unique address in the computer system. The granting of review access to the user views is achieved by disclosing the unique address of each temporary image to a reviewer and providing permission, if required, to view contents associated with the unique address of each temporary image.

In accordance with another aspect of the invention, an article is provided for editing content of a production data store containing a computer-readable signal-bearing medium with code in the medium for replicating the production data store to produce a core data store and code in the medium for producing a shadow data store of a portion of the core data store.

In accordance with another aspect of the invention, an article is provided for editing content of a production data store for use by a computer system. The article contains a computer-readable signal-bearing medium, code in the medium for replicating the production data store to produce a core data store, and code in the medium for producing a shadow data store of a portion of the core data store. Provided as well is code in the medium for generating user views for presentation to users, from the shadow data stores and the core data store, by combining content of the shadow data stores with content of the core data store to produce temporary images as user views. The article also contains code in the medium for presenting the temporary images to users as user views.

In accordance with another aspect of the invention, an article is provided that also contains code in the medium for granting review access to the user views to reviewers for reviewing the temporary images, for acceptance. The article also contains code in the medium for authorizing application of shadow data stores, associated with accepted temporary images, to the core data store, and additional code in the medium for applying the shadow data stores, associated with accepted temporary images, to the core data store to create a modified core data store. Code means in the medium is also provided for propagating the modified core data store to the production data store to produce a modified production data store. Additional support is provided in the form of code means in the medium for making the production data store available to users by selecting at least one operation from a set comprising publishing a URL associated with the production data store, granting read access to the production data store and making a first copy of the production data store from which a further copy is made for distribution. Each temporary image has an unique address in the computer system and granting review access to the user views is achieved by disclosing the unique address of each temporary image to a reviewer and providing permission, if required, to view contents associated with the unique address of each temporary image.

The present invention for editing content of a production data store applies to static as well as dynamic material and a combined use of file and database content is supported.

Using a single code base implementation which is independent of file directory or database schema structure and common tools without the need for special parsers or interpreters, developers work on assigned portion without inhibiting each other. The shadow data store used by developers contains change data only, eliminating the risk of manipulating other data used in production.

Views provide a logical joining of each set of shadow data stores with a production core data store allowing approvers to see only what is needed. In addition virtual sites can be materialized through these views, with easy switching between test and production views via universal resource locators (URL). In addition an identification means to distinguish publishable material from development material is provided, wherein "publish" provides a signal that a product or category can or cannot be viewed and "under construction" signals a product or category can only be viewed in a development instance.

Other and further advantages and features of the invention will be apparent to those skilled in the art from the following detailed description thereof, taken in conjunction with the accompanying drawings.

DESCRIPTION OF THE DRAWINGS

The invention will be better understood, and other advantages and properties will more clearly emerge, from the embodiments described below and illustrated by the following drawings in which:

FIG. 6a is a flow diagram in block form showing a read view process flow of the invention.

FIG. 6b is a flow diagram in block form showing an insert/update operation process flow of the invention.

FIG. 6c is a flow diagram in block form showing a delete process flow of the invention.

FIG. 7 is a flow diagram in block form showing a publication process of the invention.

DESCRIPTION OF THE PREFERRED EMBODIMENT

An embodiment of the invention will now be described with reference to the drawings.

Figure 1:
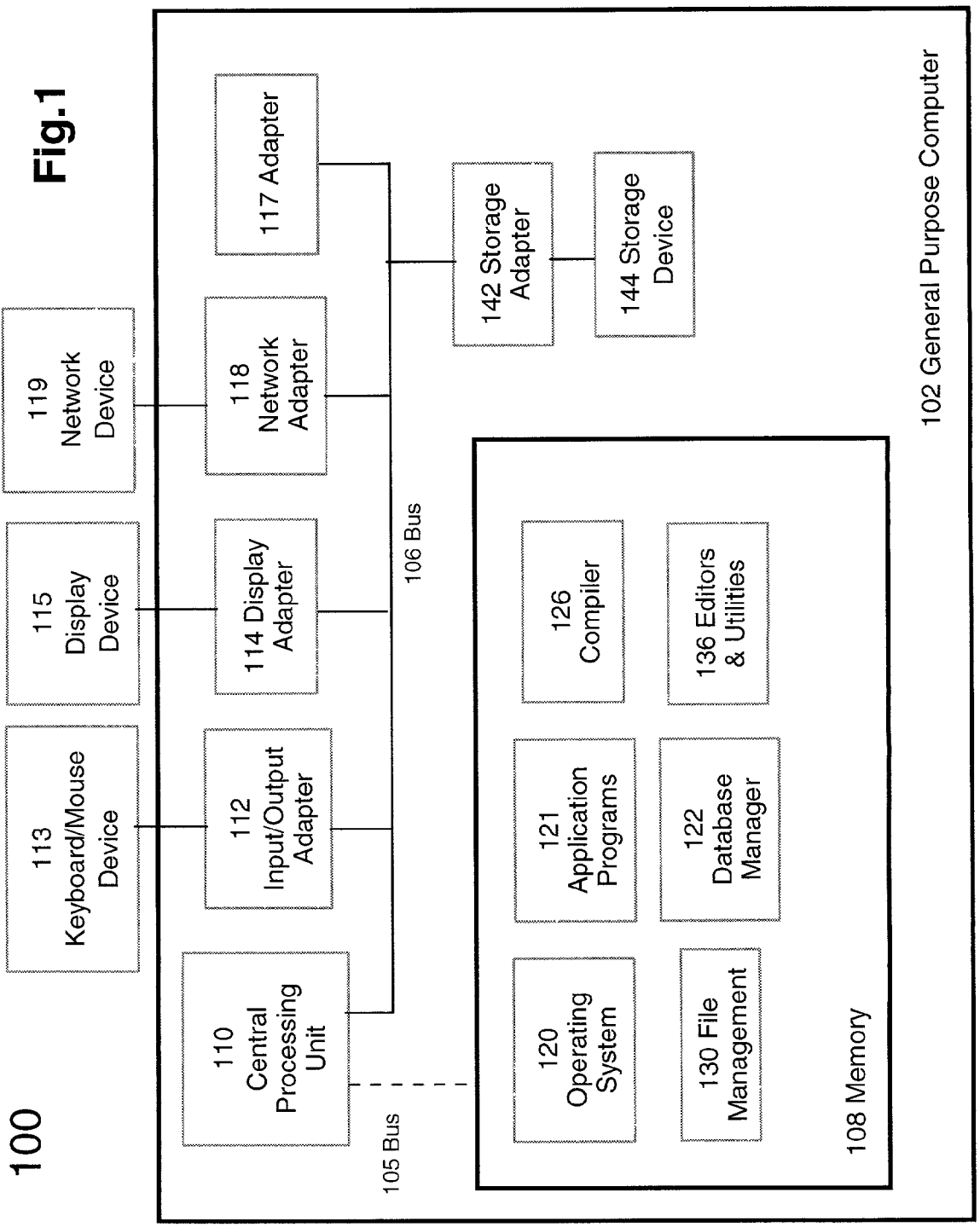
FIG. 1 is a block diagram showing a data processing system suitable for the present invention.

FIG. 1 depicts in a simplified block diagram a computer system 100 representing one embodiment for implementing the present invention. Computer 102 has a central processing unit (CPU) 110, which is a programmable processor for executing programmed instructions, such as instructions contained in application programs 121, stored in memory 108. Memory can include hard disk, tape or other media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

CPU 110 is connected to memory 108 either through a dedicated system bus 105 and/or an general system bus 106. Memory 108 can be a random access semiconductor memory for storing both executable application programs 121 and data such as that retrieved from a storage device 144 via storage adapter 142. Memory 108 is depicted conceptually as a single monolithic entity but it is well known that memory 108 can be arranged in a hierarchy of caches and other memory devices. FIG. 1 illustrates that operating system 120 and executable application programs 121 reside in memory 108.

Operating system 120 provides functions such as device interfaces, memory management, multiple task management, and the like as known in the art. CPU 110 can be suitably programmed to read, load, and execute instructions of operating system 120 and instructions of executable application programs 121. Computer system 102 has the necessary subsystems to implement editing content of a production data store as will be discussed later. Application programs 121 include server software applications in which network adapter 118 interacts with the server software application to enable computer 102 to function as a network server via network 119.

Bus 106 supports transfer of data, commands, and other information between various subsystems of computer system 102. While shown in simplified form as a single bus, bus 106 can be structured as multiple buses arranged in hierarchical form. Display adapter 114 supports video display device 115, which is a cathode-ray tube display or other suitable display technology. Input/output adapter 112 supports suitable input and output devices, such as keyboard and mouse devices 113. Storage adapter 142 supports one or more data storage devices 144, which is a magnetic hard disk drive or CD ROM drive although other types of data storage devices can be used.

Adapter 117 is used for operationally connecting many types of peripheral computing devices to computer 102 via bus 106, such as printers, bus adapters, other computers using one or more protocols including Token Ring, LAN connections, as known in the art. Network adapter 118 provides a physical interface to a suitable network 119, such as the Internet. Adapter 118 includes a modem that can be connected to a telephone line for accessing network 119. Computer 102 can be connected to another network server via a local area network using a protocol and the network server which can in turn be connected to the Internet. FIG. 1 is intended as an exemplary simplified representation of computer 102 by which embodiments of the present invention can be implemented. It is understood that in other computer systems many variations in system configuration are possible in addition to those mentioned here.

Also shown residing within memory 108 is a compiler 126 suitable for compiling programs such as those of application programs 121. There is also a file management component 130 and a database manager component 122, each being responsible for managing their respective types of data. A set of editors and utilities 136 is provided for general programming use. A description of these items and their functions will be described later.

Figure 2:
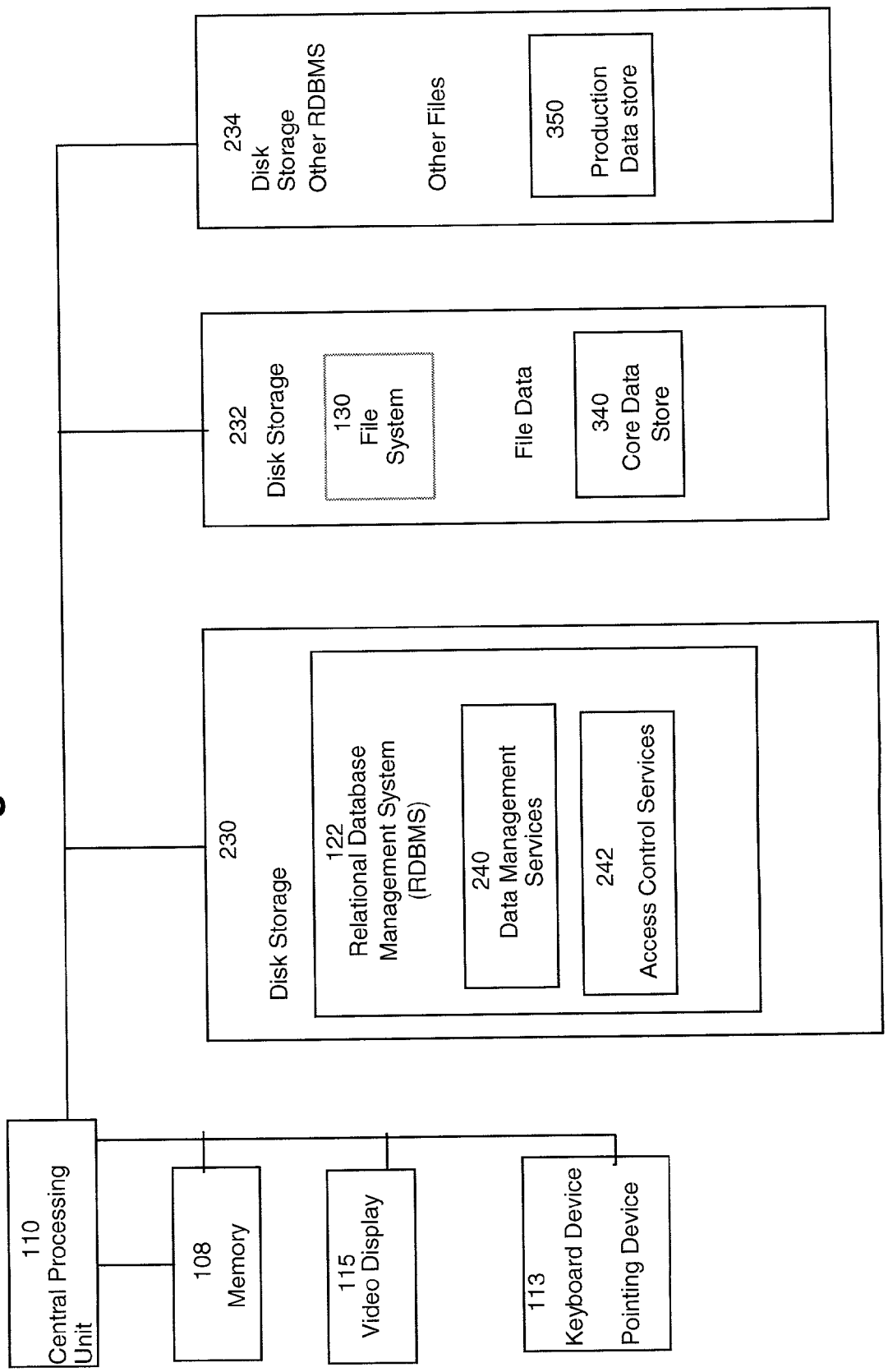
FIG. 2 is a block diagram showing a data processing system incorporating the present invention.

Referring to FIG. 2, a data processing system 200 incorporating an embodiment of the present invention is shown. The data processing system 200 comprises a central processing unit 110 that is coupled to a memory 108 into which executable program code and data is loaded. Similarly a video display 115 with a keyboard and a pointing device 113 are provided for user input output presentation means (such as reading views). A disk storage device 230, a disk storage device 232 and a storage device 234 (which may be disk or tape or other suitable device) are provided for data storage. One skilled in the art will recognize the data processing system 200 as a general purpose digital computer. In FIG. 2 the relational database management system 122 incorporating software modules is stored on and loaded from a disk storage device 230. The relational database management system 122 comprises functional modules such as data management services 240 and access control services 242. Data items such as the core data store 340, and production data store 350 associated with either the relational database management system 122 or the file management system 130 may be stored on the disk storage device 230 or other such devices as disk storage devices 232 and 234.

Figure 3:
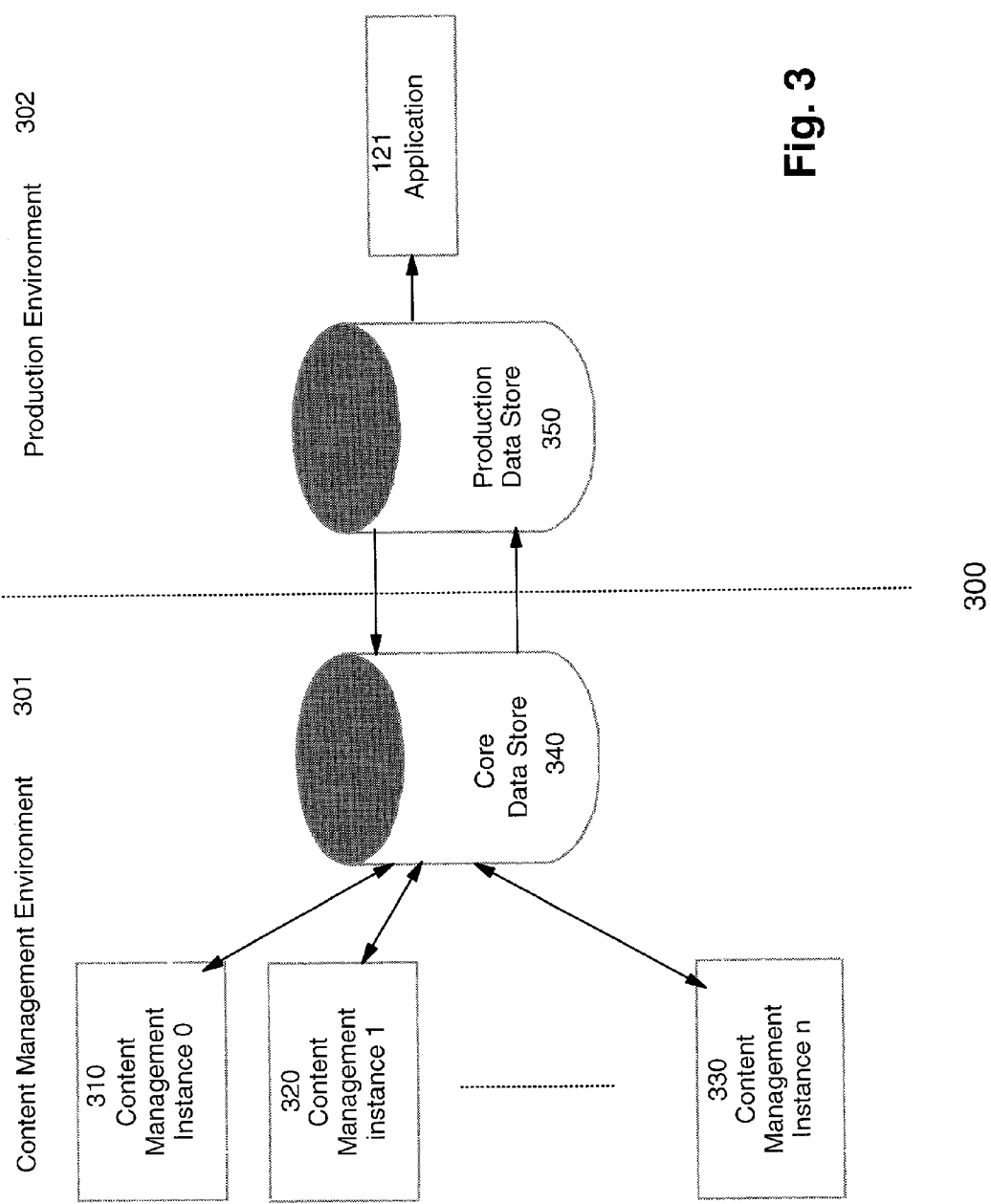
FIG. 3 is a block diagram showing a high level view of the components of the invention.

FIG. 3 depicts an example of the content management environment of the invention. The content management environment 301 as shown in a preferred embodiment is separated from the production environment 302. This advantageous approach maintains focus on changing content within the content management environment 301 while avoiding unnecessary change in the production environment 302 and associated application 121.

The content management environment 301 contains components required for the pre-production activities involved in building the production data store 350. Application 360 is invoked by users to access the contents of the production data store 350 as required.

Content management instances 0 through n (integers 310, 320 and 330) are the components under construction being developed into a future production instance. Content management instances are stored in shadow data stores and provide an overlay of change data for corresponding portions of the core data store.

As seen in FIG. 3, no content management instance is ever directly related with nor moved to the production data store. This type of separation eliminates the risk of any content being unintentionally exposed in a production mode.

Figure 4:
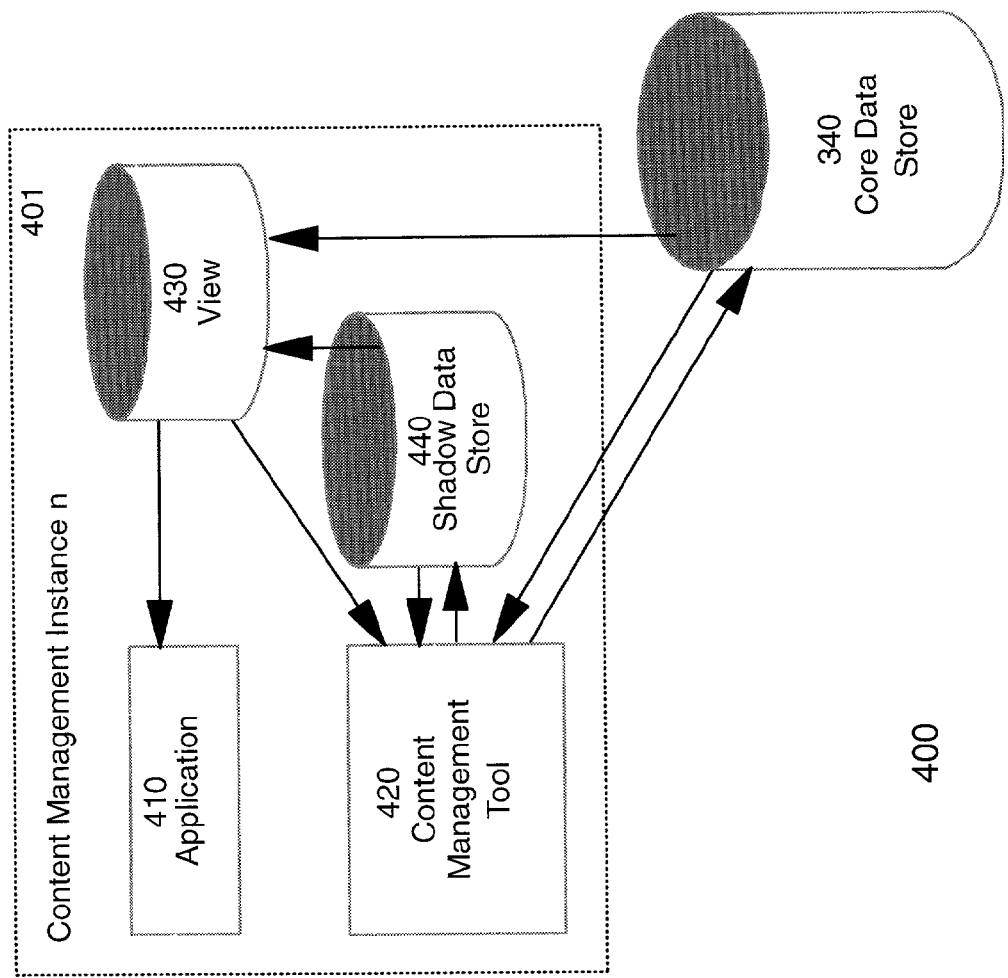
FIG. 4 is a block diagram showing a detailed view of the content management environment from FIG. 2.

FIG. 4 is a detailed representation of the content management environment introduced in FIG. 3. The content management environment 400 is shown containing a content management instance n, 401, comprised of a number of components with associated interactions. Application 121 is a generic application such as a browser or a simple tool used to provide a mock production application. Application 121 is used to access the information contained in the core data store 340. The application 121 does not deal directly with the core data store 340 but it does see the information through a component, the view 430. View 430 is a logical combination of information supplied from the core data store 340 and overlaid with change data from shadow data store 440. The data manipulation prior to viewing is done by the content management editing tool 420. The content management editing tool 420 may be a specialized tool adapted to specific circumstances and data or it may be a simple text editor. The change data in the shadow data store 440 is used to finally alter, by pushing changes into, the core data store 450 after their approval, or temporarily alter, by way of views, the presentation of information from the core data store 450.

Figure 5B:
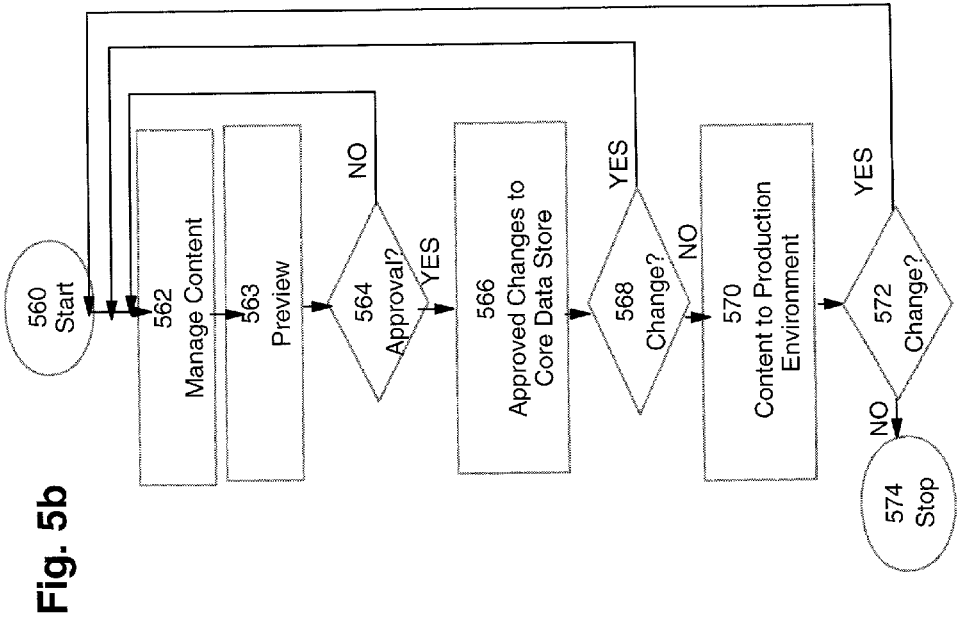
FIG. 5b is a flow diagram in block form showing an end to end process flow of the invention.
Figure 5A:
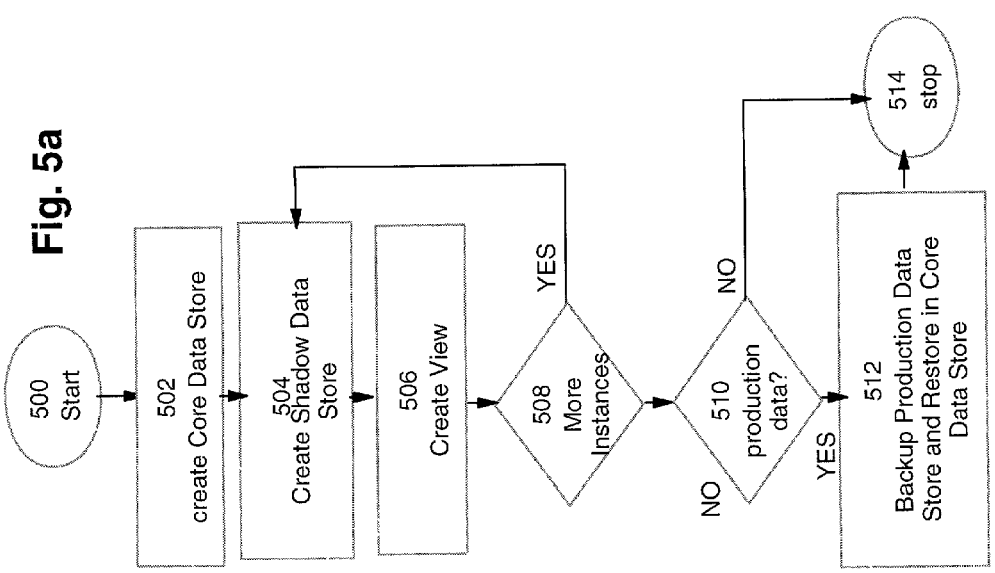
FIG. 5a is a flow diagram in block form showing an initialization process for the invention.

Referring now to FIG. 5a, the initialization process of the invention is shown. This process is performed once to create the first instance of the content management environment depicted in FIG. 3. Processing begins at Start 500 where any necessary allocations and setup may occur. Operation 502, create core data store, creates the first instance of the pre-production repository upon which changes will be implemented, tested and verified. In operation 504, a shadow data store is created to contain the instances of change data that will be applied to the recently created core data store content. Change data is composed of newly created data and data portions extracted from the core data store. Views are then created in the next operation 506. These views are logical combinations of data from the shadow data store and the core data store. Views are made accessible to users as universal resource locators (URLs). Views do not alter core data store data, they are used to present the composite of the core data store data and shadow data store data for review.

Upon completion of the view creation in operation 506, processing moves to operation 508 where a check is made for the existence of more content management instances. If more instances are found, the process loops back to operation 504 to process the instance. If no more instances are found processing moves to operation 510 where a check is made for the existence of a production data store. If no production data store exists, the process moves to end at operation 514, otherwise, the process moves to operation 512 where the production data store would be backed up during operation 512 and restored into the core data store (making a copy or replica of the production data store). The process then moves to end at operation 514.

In FIG. 5b, the end to end flow begins with operation 560, to perform any necessary setup, and moves to operation 562. During operation 562, the content management instance processing is performed (detailed later) and the process moves forward to operation 563.

During operation 563, a preview, a temporary image, of the proposed changes to the core data store is performed. The preview is accomplished through the distribution of views to selected users. After previewing the changes, the process moves to operation 564, where approval of the previewed changes is sought. Any change not approved in operation 564, is sent back for rework in operation 562. Approved changes move the process to operation 566 where the changes are added to the core data store. The pushing of the changes to the core data store is not destructive to any item currently in production as no production data is altered at this point.

Implementing approved changes in the core data store is the first step towards committing changes to a production environment. The data and the file content (referred to as content units) from the previous operations is pushed in operation 566, selectively by content unit, from the shadow data store to the core data store. After the change has been pushed to the core data store, another check is performed in operation 568 to see if the result fulfills the requirements. If the result does not meet expectations and change is necessary and the process would loop back to operation 562 for the rework of the associated content. If the resulting change to the core data store was acceptable, and no further change is needed, it is ready for scheduled propagation to production and the process moves to operation 570. Completing operation 570 moves the process to operation 572 where the change is checked again. If the change is not desired, the content unit will have to be modified on the shadow data store, in operation 562, moving through the operations in the same manner as a new change.

If the change was acceptable, operation 572 would pass process control to end the process at operation 574.

Figure 5C:
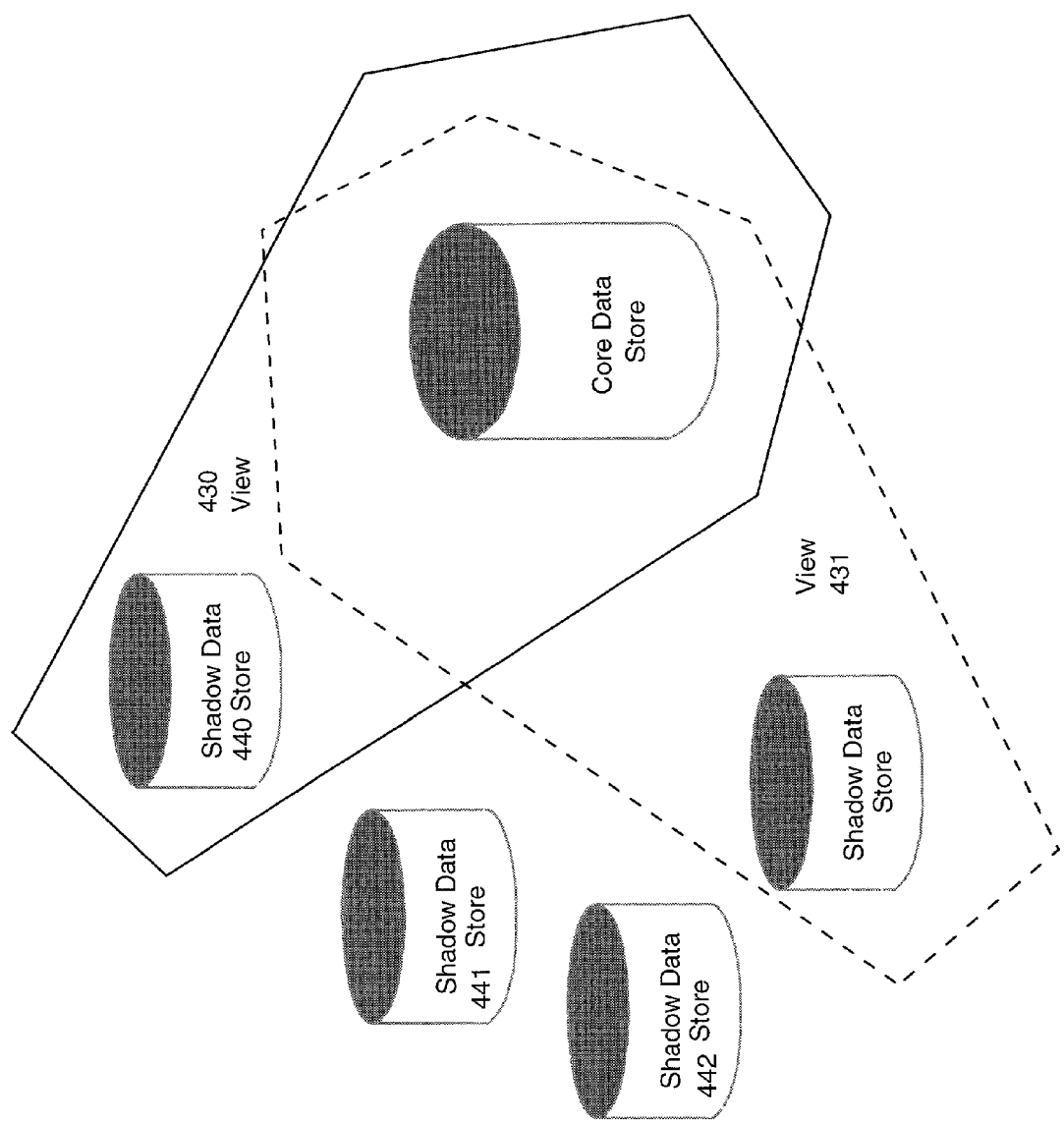
FIG. 5c is a diagram in block form showing the relationship defined by views.

Referring now to FIG. 5c, there is a representation of the logical relationship between the data of the shadow data stores and the core data store, known as a view. Shadow data stores 440, 441, 442, and 443 are shown in the example of FIG. 5c, wherein shadow data stores 440 and 443 have a view defined, view 430 and view 431, respectively. View 430, represents the logical relationship between the shadow data store 100 and the core data store 340. View 430 does not entail any physical binding. View 431 is a different and separate relationship between shadow data store 160 and the core data store 340. View 431, while sharing the same core data store, is independent of view 430. View 431 is just a presentation instance, or temporary image, of content units contained in shadow data store 160 combined with core data store 340. The materialization of change data in the view as a temporary image, allows reviewers to see the proposed result of the requested change without impacting the production data. Views, such as view 430 and view 431, provide content management developers an opportunity to selectively associate content management instances defined within a shadow data store with the core data store 340. Changes materialized in a specific view as temporary images do not become part of the core data store 340 until such changes have been reviewed, approved and implemented.

FIGS. 6a, 6b, and 6c show three types of operations dealing with data in the shadow data store.

In the simple case of FIG. 6a, beginning at operation 602, a user would open a view then see the information made available through that view for review in operation 604 and end at operation 606 closing the view. This is the means by which a reviewer would be allowed to see changes applicable to the core data store as a part of the change review and approval process.

In FIG. 6b, an insert/update operation is shown. Beginning at operation 620 opening the shadow data store, the process moves to operation 622 in which a determination is made regarding the existence of the specific data within the shadow data store. If the data exists, the process moves to operation 626 in which the shadow data store is then updated in accordance with the change supplied and the process then proceeds to end at operation 628.

If however during operation 622, the specified data cannot be located, the process would then move to operation 624. During operation 624 the specified data would be inserted into the shadow data store and upon completion the process would then move to end at operation 628.

A delete operation is shown in FIG. 6c. Processing begins with operation 650 opening the shadow data store and moves to operation 652 during which the shadow data store is examined for the existence of the specified data to be deleted. If the specified data cannot be located during operation 652 processing will be directed to operation 654. In operation 654, the specified data is inserted into the shadow data store with a delete mark added and the process would move to end at operation 662.

If during operation 652, the specified data was located, processing would then have moved to operation 656. During operation 656 the core data store is then checked for the existence of the specified data. If the specified data was not located during operation 656, the process would then move to operation 658, during which the specified data would be deleted from the shadow data store, as it was no longer required and the process would then move to stop at operation 662.

Upon locating the specified data during operation 656, the process would move to operation 660 where the located data in the shadow data store would be updated with a delete mark and the process would then move to end at operation 662.

FIG. 7 depicts the process of updating a core data store after approval of the content. Beginning at start operation 700 (initialization of applicable units is performed, this is not shown but is a well known process), the process moves to the selection of approved content units in operation 702. Each approved content unit is examined in turn in operation 704 to determine which operation, insert/update or delete, is required. If the operation requested is a delete, processing moves to operation 706 where the specified data is deleted from the core data store. After deleting the data from the core data store, the process continues to operation 714 to also delete the data from the shadow data store.

Upon completion of operation 714, a determination is made in operation 716 regarding the availability of additional components of selected content units or more content units. If there are no more units to process, the process moves to end at operation 718, otherwise the process loops back to operation 704 to continue processing the remaining units.

If during operation 704, it was determined that an insert/update request was encountered, processing would have moved to operation 708, where the core data store would have been searched for the specified data. If the specified data was not located during operation 708, processing would have moved to operation 710, otherwise if the data had been located the process would have been directed to operation 712.

During operation 710, the specified data would be inserted into the core data store, and the process moved to operation 714. In operation 714, the data would be deleted from the shadow data store and upon completion move the process to operation 716. Again during operation 716, a check is made on the availability of more units to process with the action that follows having been previously described.

If directed from operation 708 to operation 712, processing would then cause the specified data to be updated in the core data store. After performing the update, processing would move to operation 714 for processing as described previously.

The concepts of the present invention can be further extended to a variety of applications that are within the scope of this invention. Having thus described the present invention with respect to a preferred embodiment as implemented, it will be apparent to those skilled in the art that many modifications and enhancements to the present invention are possible without departing from the basic concepts as described in the preferred embodiment of the present invention. Therefore what is intended to be protected by way of letters patent should be limited only by the scope of the following claims.

The embodiments of the invention in which an exclusive property or privilege is claimed are defined as follows:

1. A method for editing content of a production data store for use by a computer system, comprising:
   replicating said production data store from a production environment to produce a core data store in a development environment, wherein the development environment is separated from the production environment;
   producing a shadow data store of a portion of said core data store within the development environment;
   modifying said shadow data store to produce a modified shadow data store; and
   generating a user view, for presentation to a user, from said modified shadow data store and said core data store, by combining content of said modified shadow data store with content of said core data store to produce a temporary image defining content available for propagation from the development environment to the production environment.

2. The method of claim 1, further comprising:
   applying said modified shadow data store to said core data store to create a modified core data store.

3. The method of claim 2, further comprising:
   propagating said modified core data store to said production data store to produce a modified production data store.

4. The method of claim 2 wherein steps of modifying said shadow data store and applying said modified shadow data store to said core data store includes operations selected from a set comprising:
   insert operations; delete operations; and update operations, wherein update operations are combinations of insert and delete operations.

5. The method of claim 1 further comprising:
   presenting said temporary image to a user.

6. The method of claim 5 wherein said temporary image is selected from a set comprising:
   a document, a software program, a software module, a graphic image, a video composition, an audio composition and a web page.

7. A data processing system for editing content of a production data store for use by a computer system, comprising:

replicating means for replicating said production data store from a production environment to produce a core data store in a development environment, wherein the development environment is separated from the production environment;

producing means for creating a shadow data store of a portion of said core data store within the development environment;

modifying means for modifying said shadow data store to produce a modified shadow data store; and generating means for generating a user view for presentation to a user, from said modified shadow data store and said core data store, by combining content of said modified shadow data store with content of said core data store to produce a temporary image defining content available for propagation from the development environment to the production environment.

8. The data processing system of claim 7, further comprising:

application means for applying said modified shadow data store to said core data store to create a modified core data store.

9. The data processing system of claim 8, further comprising:

propagating means for propagating said modified core data store to a production data store to produce a modified production data store.

10. The data processing system of claim 8 wherein steps of modifying said shadow data store and applying said modified shadow data store to said core data store includes operations selected from a set comprising:

insert operations; delete operations; and update operations wherein update operations are combinations of insert and delete operations.

11. The data processing system of claim 7, further comprising:

presenting means for presenting said temporary image to a user.

12. The data processing system of claim 11 wherein said temporary image is selected from a set comprising:

a document, a software program, a software module, a graphic image, a video composition, an audio composition and a web page.

13. An article for editing content of a production data store for use by a computer system, comprising:

a computer-readable medium;

code means in the medium for replicating said production data store from a production environment to produce a core data store in a development environment, wherein the development environment is separated from the production environment;

code means in the medium for producing a shadow data store of a portion of said core data store within the development environment;

code means in the medium for modifying said shadow data store to produce a modified shadow data store; and code means in the medium for generating a user view for presentation to a user, from said modified shadow data store and said core data store, by combining content of said modified shadow data store with content of said core data store to produce a temporary image defining content available for propagation from the development environment to the production environment.

14. The article of claim 13, wherein the medium is a data storage medium capable for recording data.

15. The article of claim 14, wherein the medium is selected from a group consisting of magnetic, optical, biological and atomic data storage media.

16. The article of claim 13, wherein the medium is a modulated carrier signal.

17. The article of claim 16, wherein the medium is a transmission over at least one selected from a group of networks comprising the Internet and Extranet.

* * * * *